United States Patent
Rieffanaugh, Jr.

(10) Patent No.: US 8,880,550 B2
(45) Date of Patent: Nov. 4, 2014

(54) POINT IN PHASETIME SYSTEM AND METHOD THEREOF

(76) Inventor: Neal King Rieffanaugh, Jr., Newport Beach, CA (US)

( * ) Notice: Subject to any disclaimer, the term of this patent is extended or adjusted under 35 U.S.C. 154(b) by 216 days.

(21) Appl. No.: 13/199,862

(22) Filed: Sep. 12, 2011

(65) Prior Publication Data

US 2012/0066254 A1    Mar. 15, 2012

Related U.S. Application Data

(60) Provisional application No. 61/403,121, filed on Sep. 11, 2010.

(51) Int. Cl.
| G06F 7/00 | (2006.01) |
| G06F 17/30 | (2006.01) |
| G06Q 10/06 | (2012.01) |

(52) U.S. Cl.
CPC ................................... *G06Q 10/06* (2013.01)
USPC ........................................................ 707/769

(58) Field of Classification Search
USPC .................................. 707/769, 722
See application file for complete search history.

(56) References Cited

U.S. PATENT DOCUMENTS

| 5,537,524 | A | * | 7/1996 | Aprile ........................... 345/440 |
| 6,036,345 | A | * | 3/2000 | Jannette et al. ................. 700/97 |
| 7,908,167 | B1 | * | 3/2011 | Crum et al. ................... 705/7.38 |
| 2007/0038977 | A1 | * | 2/2007 | Savage .......................... 717/106 |
| 2008/0140485 | A1 | * | 6/2008 | Williams .......................... 705/7 |
| 2010/0180260 | A1 | * | 7/2010 | Chikkadevaiah et al. .... 717/125 |
| 2010/0185547 | A1 | * | 7/2010 | Scholar ............................ 705/80 |
| 2011/0295643 | A1 | * | 12/2011 | Miller et al. ................. 705/7.23 |

* cited by examiner

*Primary Examiner* — Tony Mahmoudi
*Assistant Examiner* — Merilyn Nguyen

(57) ABSTRACT

A Phasetime Method and Automated System for tracking Element Efforts that result in end products, at least including products of art, industry, and nature, and reporting Development Event Efforts by their virtual Points in Phasetime within designated Past, Present, and Future Project Development Phases. Dynamically generated Phasetime Reports display Element Project Efforts within a live Phasetime Matrix in relation to their Phase of Development and Points in Phasetime. Development Events occur within Project Development Phases, which Phases may vary in number and kind depending on the end product. Development Events include Project Production Elements, Element Efforts, the duration of said Efforts, and Efforts' Points in Phasetime. Element Efforts, tracked by Phasetime Project Development Event Instances, are reported in edited Storyboard Beats in Phasetime Macro, Micro, and Nano Views depicting the Efforts' effect on the end Product's Storyline. Effortology keys allow browsers to alter the Storyboard Storyline Report.

2 Claims, 14 Drawing Sheets

POINT IN PHASETIME SYSTEM AND METHOD THEREOF

CROSS REFERENCE OF RELATED APPLICATION

This Non-Provisional application claims the benefit of priority under 35 U.S.C. sctn. 119 to a Provisional Application No. 61/403,121 filed Sep. 11, 2010, the contents of which are incorporated herein in their entirety.

BACKGROUND OF THE PRESENT INVENTION

1. Field of Invention

The present invention is directed to a dynamic method for the collecting, tracking, storing, and reporting of Development Event Efforts as to their Points in Phasetime within a Phase of Development of a Product, regardless if those Efforts are energies expended by Elements comprising any one or more animal, vegetable or mineral substance or matter, and regardless of the nature of the Product.

2. Description of Related Arts

Patent No. 7,034,78 Irmer; Frank, Archibald; Nicholas Ian

The above referenced Patent which includes a reference to phasetime is in an unrelated field and whose method has no relevance to the method of the present invention.

DETAILED DESCRIPTION OF THE PREFERRED EMBODIMENT

Referring to the drawings of the invention, a Point in Phasetime System and Method Thereof are illustrated. It is understood that the components could be designed, arranged, and developed in a myriad of configurations not displayed. It is also understood that the following detailed description of the present invention as referenced in the drawings is not intended to limit the scope of the present invention as claimed, but is only for illustration of the preferred embodiment of the present invention.

The present preferred embodiment of the invention will best be understood by reference to the drawings, wherein like parts are designated by like numerals throughout.

LIST OF REFERENCE NUMERALS

Figure 1:
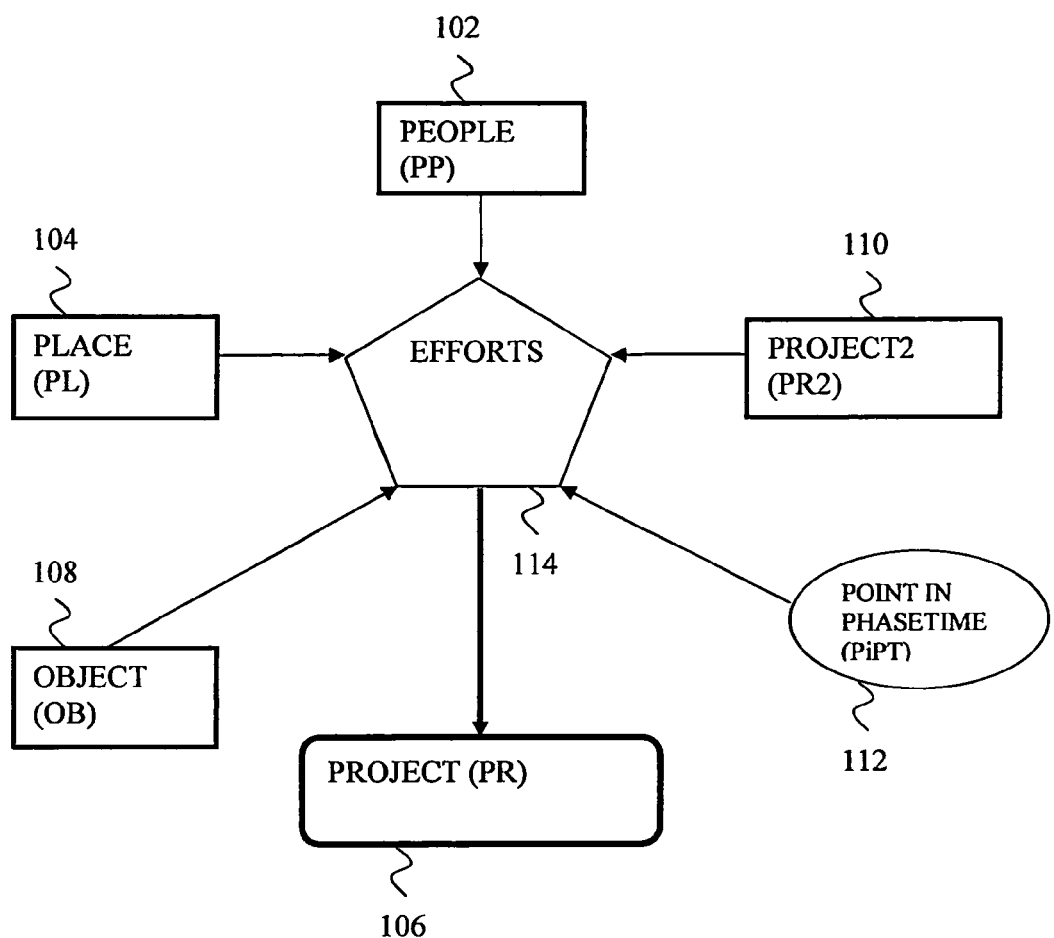
FIG. 1 Element Drawing illustrates the Elements and the Elements' Efforts on a Project that form Effort Instances within the "Point in Phasetime Method and System Thereof"

100. Elements
102. People (PP)
104. Places (PL)
106. Projects (PR)
108. Objects (OB)
110. Project2 (PR2)
112. Point In Phasetime (PiPT)
114. Effort
116. Effort Instances
118. Role
120. Services
122. Contribution
124. Utilization
126. Effort Instance and Phasetime Data Virtual Matrix
128. - - -
129. People to Projects Association
130. People to Places Association
132. People to Objects Association
134. Places to Objects Association
136. - - -
138. - - -
140. Effort Instance and Phasetime Data Collection Interfaces
142. - - -
144. - - -
146. - - -
148. Core Database 150. Data Repository Database
152. Past Project Efforts
154. Present Project Efforts
156. Future Project Efforts
158. - - -
160. Data Search Query Interfaces
162. People Effort Instance Report
164. Places Effort Instance Report
166. Projects Effort Instance Report
168. Objects Effort Instance Report
170. - - -
172. Phasetime Matrix Report
174. Section 1: Header
176. Section 2: Phasetime Matrix
178. Arrow of Phasetime X Axis
179. Section 3: Effort Instance PiPT Window
180. Phasetime Report Modules
182. Phasetime Report Header Module
184. Phasetime Matrix Generator Module
186. Phasetime X Axis (Start/End Dates) Generator Module
188. Phasetime Effort Instance Module
192. Past/Present/Future Indicator
194. Effort Instance Owner
196. Storyboard Beats. In Phasetime
200. Efforts In Phasetime
202. Macro Phasetime
204. Micro Phasetime
206. Nano Phasetime
208. Phases of Development
210. Concept Development (Blueprint)
212. Pre-Production
214. Production
216. Post-Production
218. Manufacturing, Distribution, and Promotion
220. Post Manufacturing, Distribution, and Promotion
222. Phase Boxes
224. Effort Phase Box
226. Phasetime Clockworks
228. Phasetime Clockwork I
230. Phasetime Clockwork II
232. Phasetime Clockwork III
234. Phasetime Clockwork IV
236. Phasetime Clockwork V
238. Phasetime Clockwork VI
240. Storyboard Header Section
242. Storyboard Body Section
244. Storyboard Footer Section
246. Macro, Micro, Nano Multimedia Content
248. Search Links
250. Effortology Key
252. Macro, Micro, Nano Storyboard Modules
254. Storyboard Header Generator Module
256. Storyboard Multimedia Body Generator Module
258. Storyboard Footer Generator Module
260. Macro, Micro, Nano Multimedia Database
262. - - -
268. Editing and Formatting Processes
270. Phasetime Matrix Report Generating Module
272. PiPT Effort Instance Indicator
274. Arrow of Phasetime Clockwork Icons
300. Project Phasetime
301. - - -
302. Publication Date
303. Phasetime Parturient Event
304. Published Product
306. Product Storyline Data
307. Storyline Editor
308. Macro, Micro, and Nano Editing Process
309. Effortologist
310. Phasetime Macro Storyline View Generating Modules
312. Phasetime Macro Storyline View
314. Phasetime Micro Storyline View Generating Modules
316. Phasetime Micro Storyline View
318. Phasetime Nano Storyline View Generating Modules
320. Phasetime Nano Storyline View
322. - - -
324. Phasetime Macro
326. Phasetime Micro
328. Phasetime Nano
330. - - -
332. Beats in Phasetime
334. Phasetime Development Event Instance
336. Storyline
338. Storylinevent Published Data
340. Storylinefforts/Storylinefx Data

SUMMARY OF THE PRESENT INVENTION

This invention relates to Phasetime tracking and reporting processes and systems. More specifically, it relates to scientifically gathering, storing and reporting of Element Effort Phasetime Data in a Product's Development as a Project flows through its development Phases of Production, which data is then dynamically reported by the system according to the system's Points in Phasetime process.

DETAILED DESCRIPTION OF THE DRAWINGS

Figure 2:
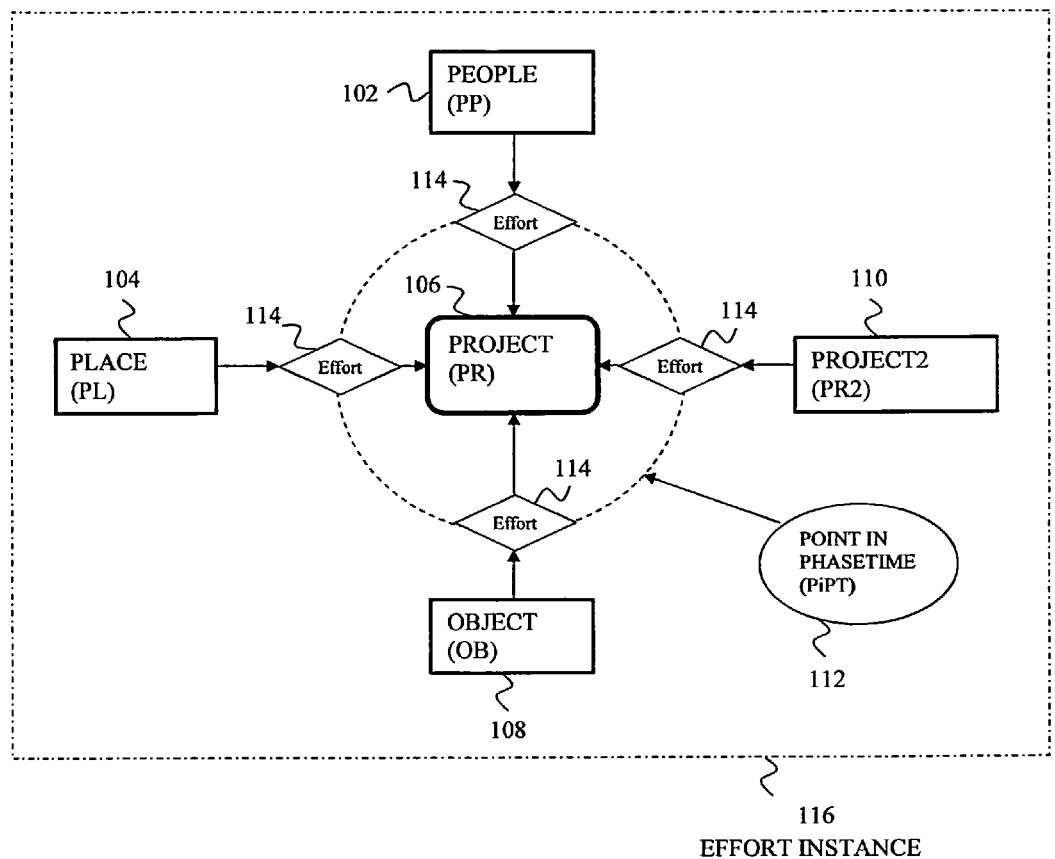
FIG. 2 Points in Phasetime Effort Instance Drawing details the significance of the Effort values in the association of Elements according to the "Point in Phasetime Method and System Thereof" and establishes the core building blocks of an Effort Instance and Phasetime Data Virtual Matrix.
Figure 4:
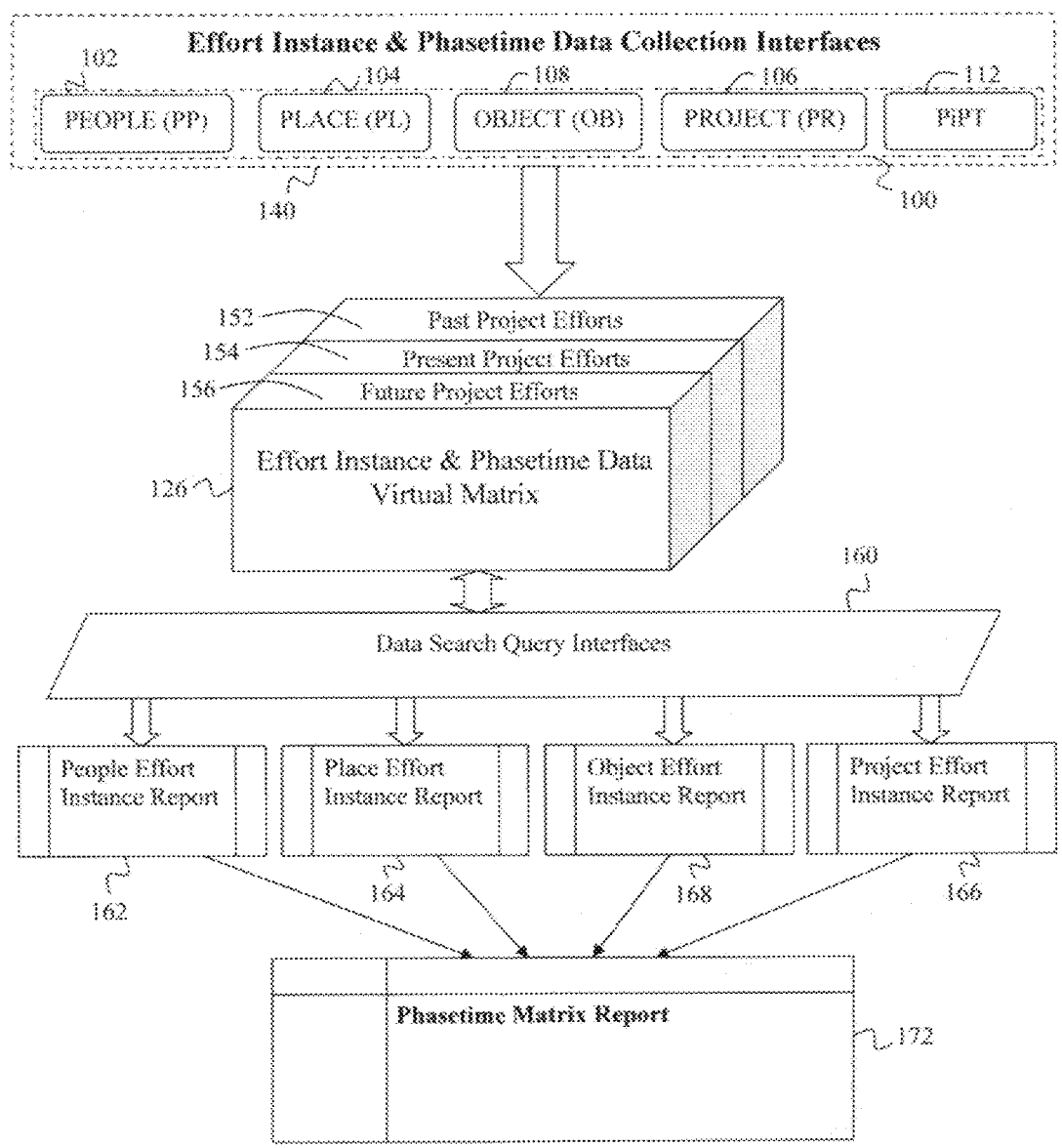
FIG. 4 Effort Instance & Phasetime Data Drawing illustrates the Effort Instance & Phasetime Data Collection Interfaces and the Data Search Query Interfaces which result in the Element Report data reflected in the Phasetime Matrix Report.

FIG. 1 illustrates the "Point In Phasetime Method and System Thereof" is comprised of an Effort Instances 116 see FIG. 2 which are constructed of an Elements 100 see FIG. 4 that are associated to one another via an Effort 114 on a Project (PR) 106 at a Point In Phasetime (PiPT) 112.

Elements 100 can include, but are not limited to, the following:

Project (PR) 106—required Element 100 on which all other Elements 100 have Efforts 114.

Figure 3:
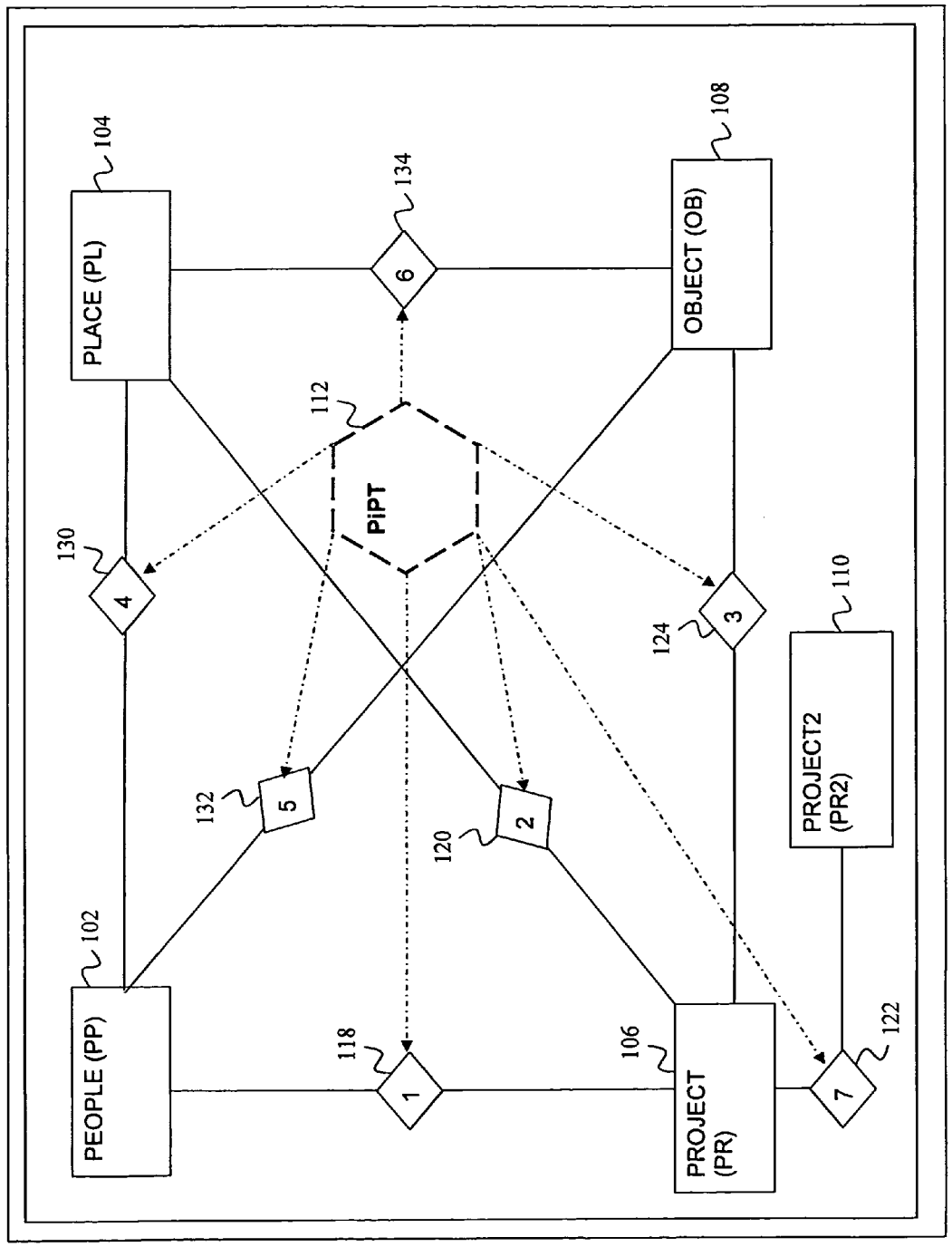
FIG. 3 Points in Phasetime Effort Instance Association Structure Drawing defines the associative characteristics of the "Point in Phasetime Method and System Thereof" as it relates to an Effort Instance and Phasetime Data Virtual Matrix.

A People (PP) 102—Element 100 who has Effort 114, referred to as a Role 118 see FIG. 3, on Project (PR) 106.

A Places (PL) 104—Element 100 which has Effort 114, referred to as a Services 120 see FIG. 3, on Project (PR) 106.

An Object (OB) 108—Element 100 which has Effort 114, referred to as a Utilization 124, on Project (PR) 106.

A Project2 (PR2) 110—another Project 106 Element 100 which has Effort 114, referred to as a Contribution 122 see FIG. 3, on Project (PR) 106.

Point in Phasetime 112—virtual Element 100 which defines the point within a phasetime at which an Element's 100 Effort 114 occurred on Project (PR) 106 see FIG. 2.

FIG. 1 details that Effort 114 values represent an exertion (or use of energy) expended on Project (PR) 106 by Element 100 in the development of an end product. Effort 114 values tie Element 100 to Project 106 based on the particular perspective of the Element 100 according to the following:

People (PP) 102 Effort 114 on Project (PR) 106=Role 118 Value

Places (PL) 104 Effort 114 on Project (PR) 106=Services 120 Value Project2 (PR2) 110 Effort 114 on Project (PR) 106=Contribution 122 Value Object (OB) 108 Effort 114 on Project (PR) 106=Utilization 124 Value FIG. 2 illustrates the significance of Effort 114 values in the association of Elements 100 according to the "Point in Phasetime Method and System Thereof" and establishes the core building blocks of an Effort Instance and Phasetime Data Virtual Matrix 126 see FIG. 4.

Both FIG. 1 and FIG. 2 illustrate that the "Point in Phasetime Method and System Thereof" is comprised of Effort Instances 116, wherein Effort Instances 116 are constructed of Elements 100 associated to one another via their Effort 114 on Project (PR) 106 at Point In Phasetime (PiPT) 112.

FIG. 2 builds on this principle by defining that Points of Phasetime 112 indicate "when" all Elements 100 exerted their Efforts 114 on Project (PR) 106, wherein each of the Elements 100 are related to one another through their association to Project (PR) 106 during the shared Point in Phasetime 112. The shared commonality of Point in Phasetime 112 with Elements 100 in their association to Project (PR) 106 is the binding principle that allows for Effort Instance and Phasetime Data Virtual Matrix 126.

FIG. 3 defines the associative characteristics of the "Point in Phasetime Method and System Thereof" as it relates to Effort Instance and Phasetime Data Virtual Matrix 126.

FIG. 2 illustrates that the "Point in Phasetime Method and System Thereof" is comprised of Effort Instances 116 which are constructed of Elements 100 that are associated to one another via their Efforts 114 on Project (PR) 106 at Point in Phasetime 112. FIG. 3 further establishes the relevancy of Point in Phasetime 112, as a virtual fifth Element 100, being a necessary component in the association of all Elements 100 to one another.

Figure 6:
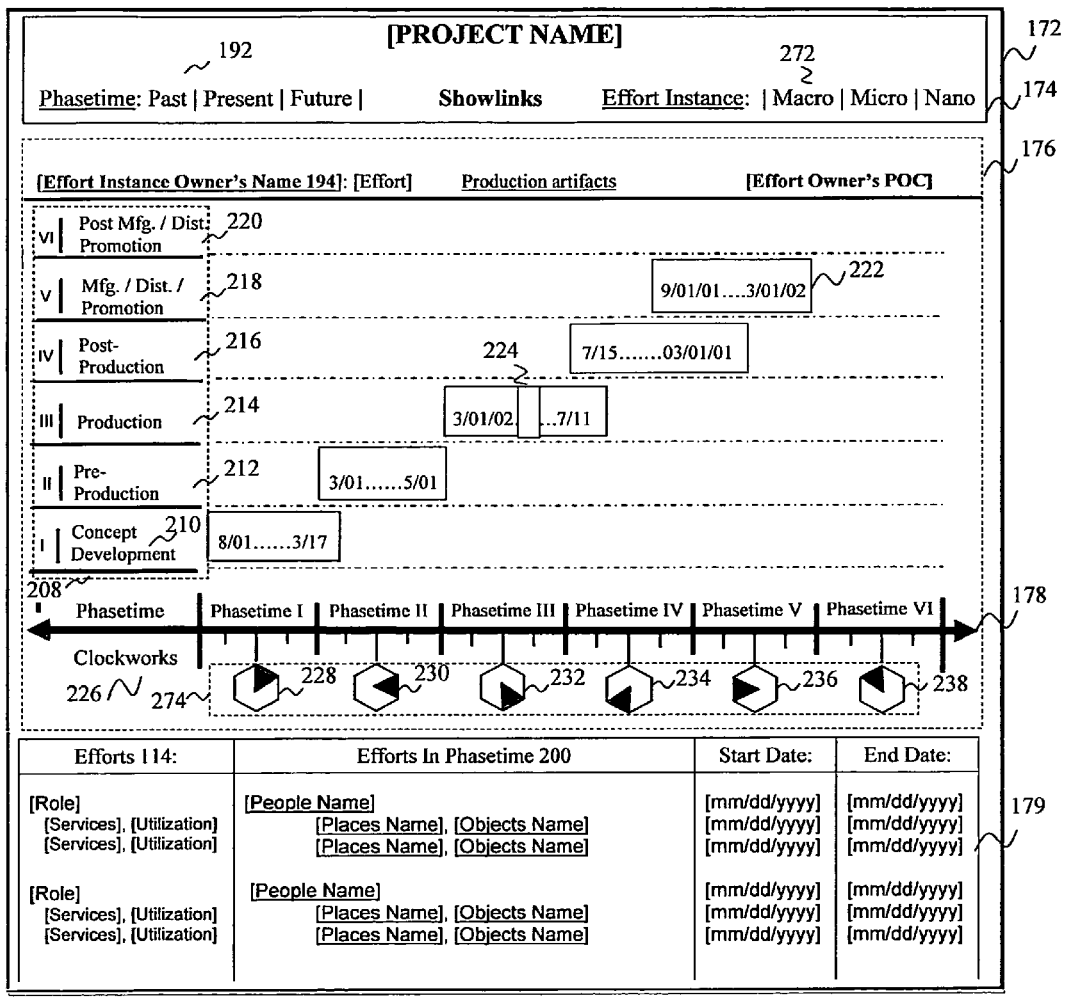
FIG. 6 Phasetime Matrix Drawing illustrates the reporting capabilities of the "Point in Phasetime Method and System Thereof" as related to the display of an Effort Instance Owner's Effort Instance Report.

Specifically, Effort Instance and Phasetime Data Virtual Matrix 126 illustrates the following associations can be made between Elements 100 within the "Point in Phasetime Method and System Thereof," wherein Point in Phasetime 112 value represents the point in a Phases of Development 208 see FIG. 6 at which the association occurs:
- [1]—People to Project Association 129=Associative value Role 118 that defines "what People (PP) 102 did on Project (PR) 106" at Point In Phasetime (PiPT) 112.
- [2]—Places to Project Association 120=Associative value Services 120 that defines "what Places (PL) 104 did on Project (PR) 106" at Point in Phasetime (PiPT) 112.
- [3]—Object to Project Association 124=Associative value Utilization 124 that defines "what Object (OB) 108 did on Project (PR) 106" at Point In Phasetime (PiPT) 112.
- [4]—A People to Places Association 130=Associative value that ties People (PP) 102 to Places (PL) 104 at Point In Phasetime (PiPT) 112.
- [5]—A People to Objects Association 132=Associative value that ties People (PP) 102 to Objects (OB) 108 at Point In Phasetime (PiPT) 112.
- [6]—A Places to Objects Association 134=Associative value that ties Places (PL) 104 to Objects (OB) 108 at Point In Phasetime (PiPT) 112.
- [7]—Project2 to Project Association=Associative value Contribution 122 that defines "what Project2 (PR2) 110 did on Project (PR) 106" at Point in Phasetime (PiPT) 112.

FIG. 4 illustrates both the Effort 114 data collection and Effort 114 data reporting capabilities of the "Point in Phasetime Method and System Thereof."

Figure 8:
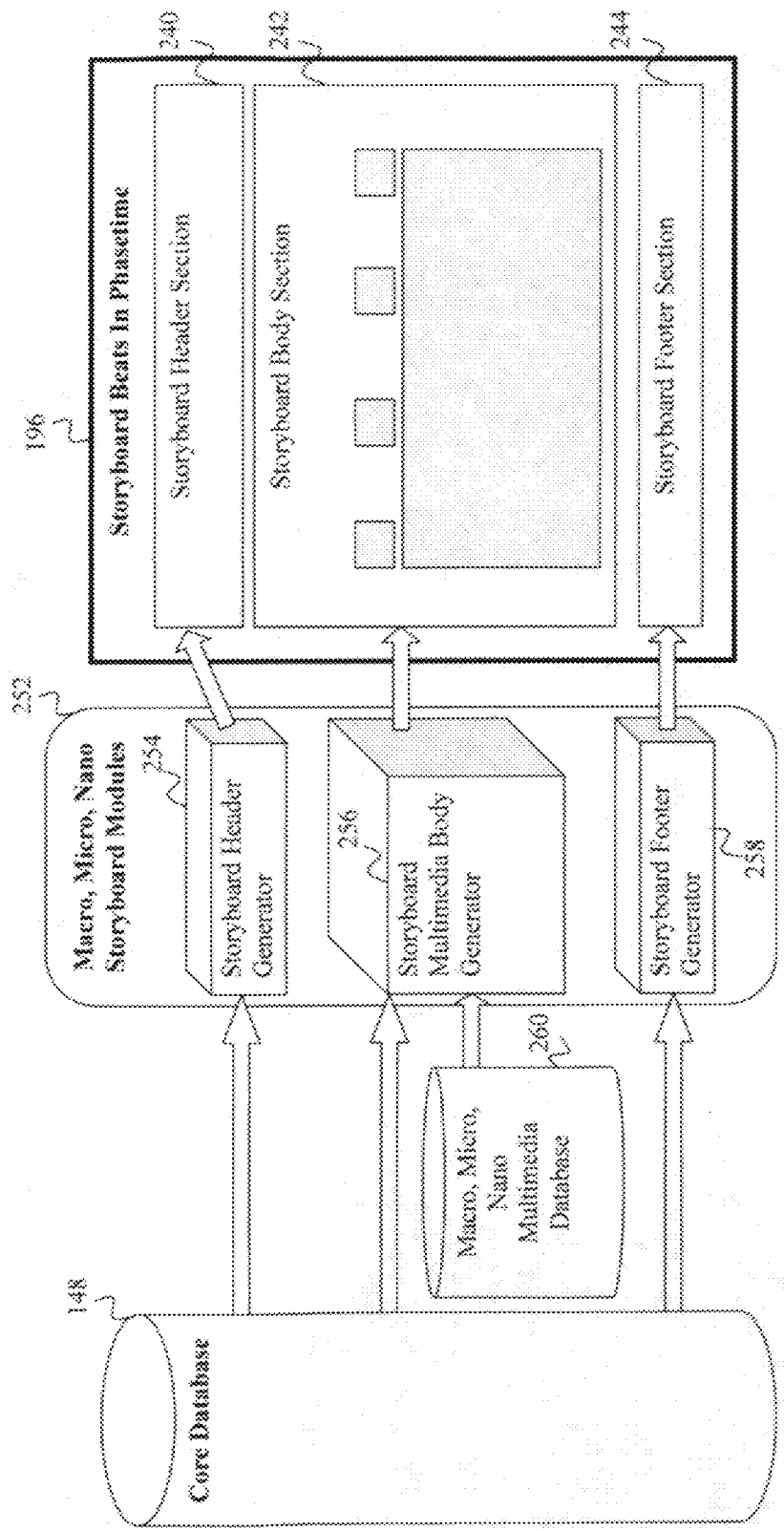
FIG. 8 Phasetime Multi-Event Storyboard Logic Data Flowchart drawing delineates the System parameters used to generate Storyboard Beats in Phasetime data from the Point in Phasetime data in the Core Database.
Figure 9:
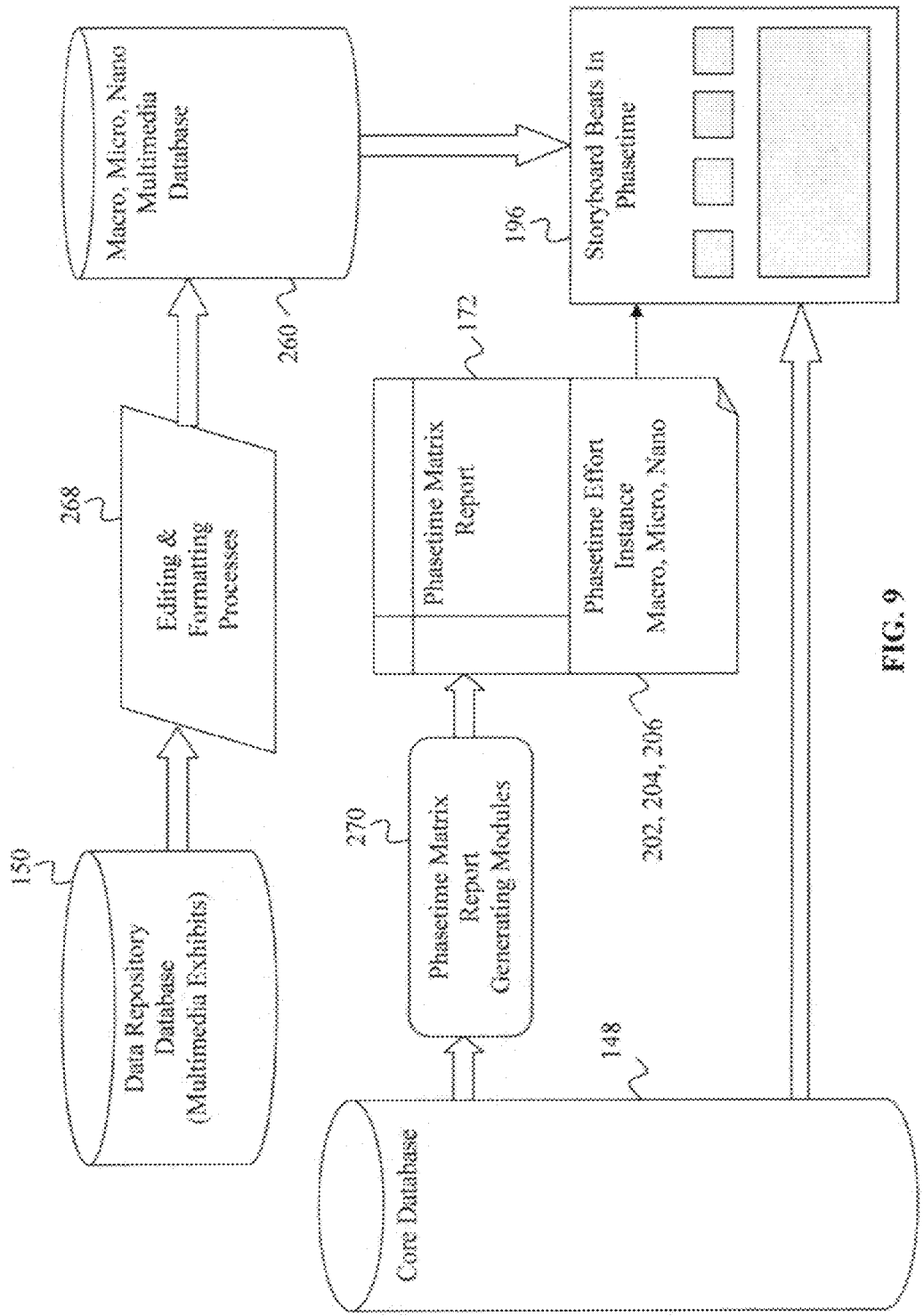
FIG. 9 Effort Instance Macro, Micro, and Nano Logic Data Flowchart details the System databases and reporting modules used by the "Point in Phasetime Method and System Thereof" in the generation of the Phasetime Matrix Report and the Storyboard Beats in Phasetime.

According to FIG. 4, Element 100 data, Effort Instance 116 data, and Point in Phasetime 112 data are collected utilizing an Effort Instance and Phasetime Data Collection Interfaces 140 including:
- Data collection forms,
- Data validation and verification interfaces and processes, and
- Data reporting interfaces and processes enabling migration of data from a Data Repository Database 150 see FIG. 9 to a Core Database 148 see FIG. 8.

As defined by FIGS. 1, 2, and 3, the "Point in Phasetime Method and System Thereof" is comprised of Effort Instances 116 which are constructed of Elements 100 that are associated to one another via their Efforts 114 on Project (PR) 106 within Point In Phasetime (PiPT) 112. According to FIG. 4, Effort Instances 116 are stored in Core Database 148 and processed by Effort Instance and Phasetime Data Virtual Matrix 126.

Point in Phasetime (PiPT) 112 values are particularly important in the "Point in Phasetime Method and System Thereof" as they delineate when events and associations, occur. They also have the ability to define:
- A Past Project Efforts 152—Those Effort Instances 116 that define associations to and Efforts 114 on Project (PR) 106 that has been released as a Published Product 304.
- A Present Project Efforts 154—Those Effort Instances 116 that define associations to and Efforts 114 on Project (PR) 106 that are currently in a Production 214 and have a contracted release date.
- A Future Project Efforts 156—Those Effort Instances 116 that define associations to and Efforts 114 on Project (PR) 106 that have a contracted release date but are not yet in Production 214.

Effort Instance 116 and Point in Phasetime 112 data are generated from Core Database 148 by Effort Instance and Phasetime Data Virtual Matrix 126 in response to data search queries executed from a Data Search Query Interfaces 160, wherein the following dynamic Effort Instance 116 reports are the result of data search queries:
- A People Effort Instance Report 162—A report from People (PP) 102 perspective that details Effort Instance 116 data, Elements 100, Associations 130 132 134, Efforts 114, and Point in Phasetime 112.
- A Places Effort Instance Report 164—A report from Places (PL) 104 perspective that details the Effort Instance 116 data, Elements 100, Associations 130 132 134, Efforts 114, and Point in Phasetime 112.
- A Projects Effort Instance Report 166—A report from Projects (PR) 106 perspective that details Effort Instance 116 data, Elements 100, Associations 130 132 134, Efforts 114, and Point in Phasetime 112.
- An Objects Effort Instance Report 168—A report from Objects (OB) 108 perspective that details Effort Instance 116 data, Elements 100, Associations 130 132 134, Efforts 114, and Point in Phasetime 112.

FIG. 4 details that a Phasetime Matrix Reports 172 can be accessed from the queried Effort Instance Reports 162 164 166 168. Phasetime Matrix Reports 172 can display, but are not limited to, the following:
- A Section 1: Header 174
- A Section 2: Phasetime Matrix 176
- An Arrow of Phasetime X Axis 178
- A Section 3: Effort Instance PiPT Window 179

Figure 5:
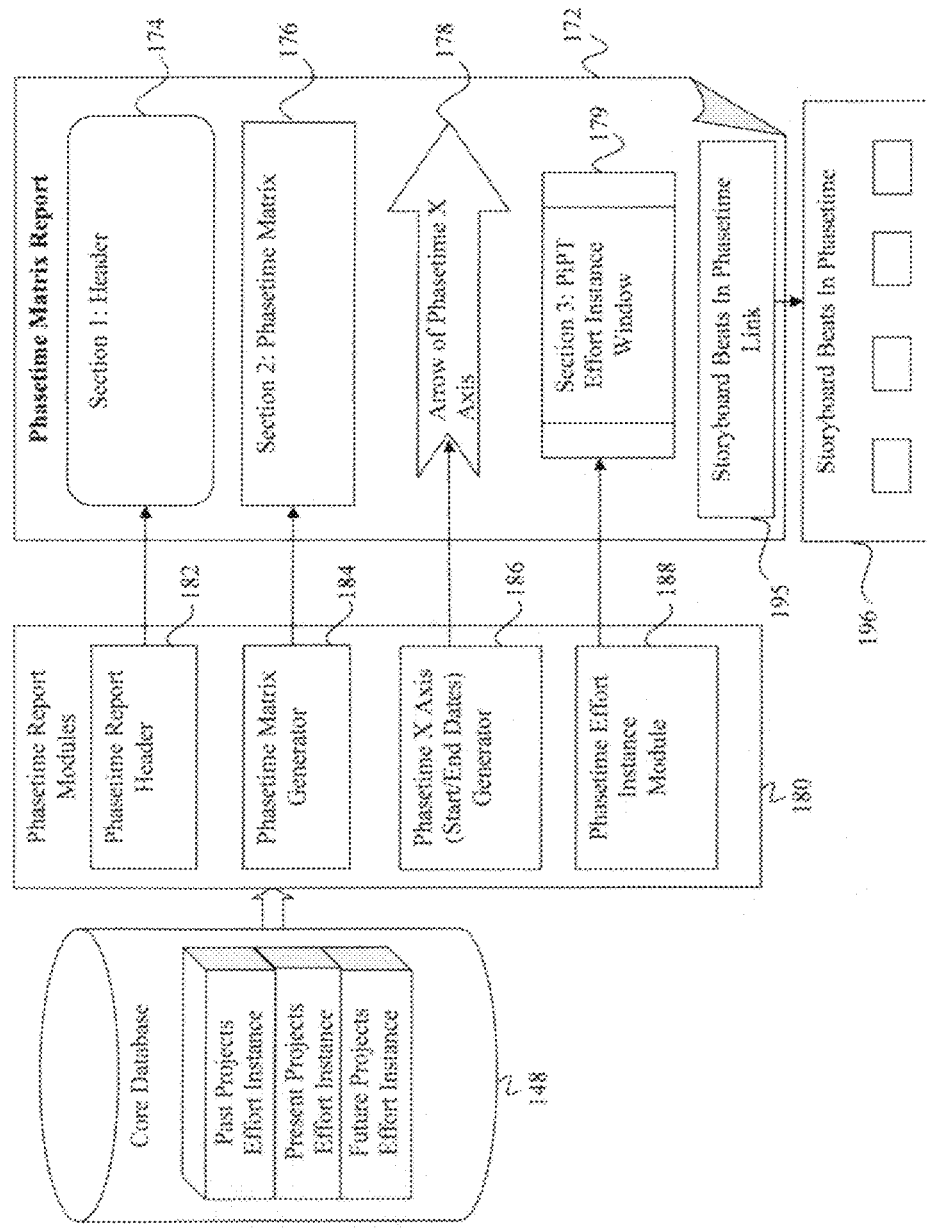
FIG. 5 Phasetime Matrix Report Flowchart Drawing defines the Database Efforts Data, Phasetime Matrix Modules and Components used in "Point in Phasetime Method and System Thereof" as they relate to the structure and data found within the Phasetime Matrix Report.

FIG. 5 defines the System database parameters used in "Point in Phasetime Method and System Thereof" as they relate to the structure and data found within Phasetime Matrix Report 172.

According to FIG. 4, Core Database 148 stores Past (Published), Present, and Future Project Efforts 152 154 156 whereby they are processed by Effort Instance and Phasetime Data Virtual Matrix 126 in response to a query. FIG. 5 builds on the principle by defining a Phasetime Report Modules 180 used to generate Point in Phasetime 112 data, wherein the modules are used to output Point in Phasetime 112 data within Phasetime Matrix Report 172.

Phasetime Report Modules 180 can include, but are not limited to, the following:

- A Phasetime Report Header Module 182
- A Phasetime Matrix Generator Module 184
- A Phasetime X Axis (Start/End Dates) Generator Module 186
- A Phasetime Effort Instance Module 188

Each of the above Phasetime Report Modules 180 is used to generate specific attributes within Phasetime Matrix Reports 172:

Phasetime Header Module 182—generates Section 1: Header 174 within Phasetime Matrix Report 172 that includes the Project's 106 name, a Past/Present/Future Indicator 192, and Effort Instance 116 an PiPT Effort Instance Indicator 272.

Phasetime Matrix Generator Module 184—generates Section 2: Phasetime Matrix 176 within Phasetime Matrix Report 172 in the form of a two-dimensional graphical display with three-dimensional attribute timeline which also displays an Effort Instance Owner's 194 general information and Effort 114 on Project (PR) 106.

Phasetime X Axis (Start/End Dates) Generator Module 186—generates Arrow of Phasetime X Axis 178 within Phasetime Matrix Report 172; wherein Arrow of Phasetime X Axis 178 is a linear phasetime indicator that details the scope, from start date to end date, of Project (PR) 106 in which Effort Instances 116 exist.

Phasetime Effort Instance Module 188—generates Section 3: Effort Instance PiPT Window 179 within Phasetime Matrix Report 172, wherein Section 3: Effort Instance PiPT Window 179 displays Effort Instance Reports 162 164 166 168 and links indicating which Elements 100 have Efforts 114 on the Project (PR) 106 within Section 2: Phasetime Matrix 176.

Figure 7:
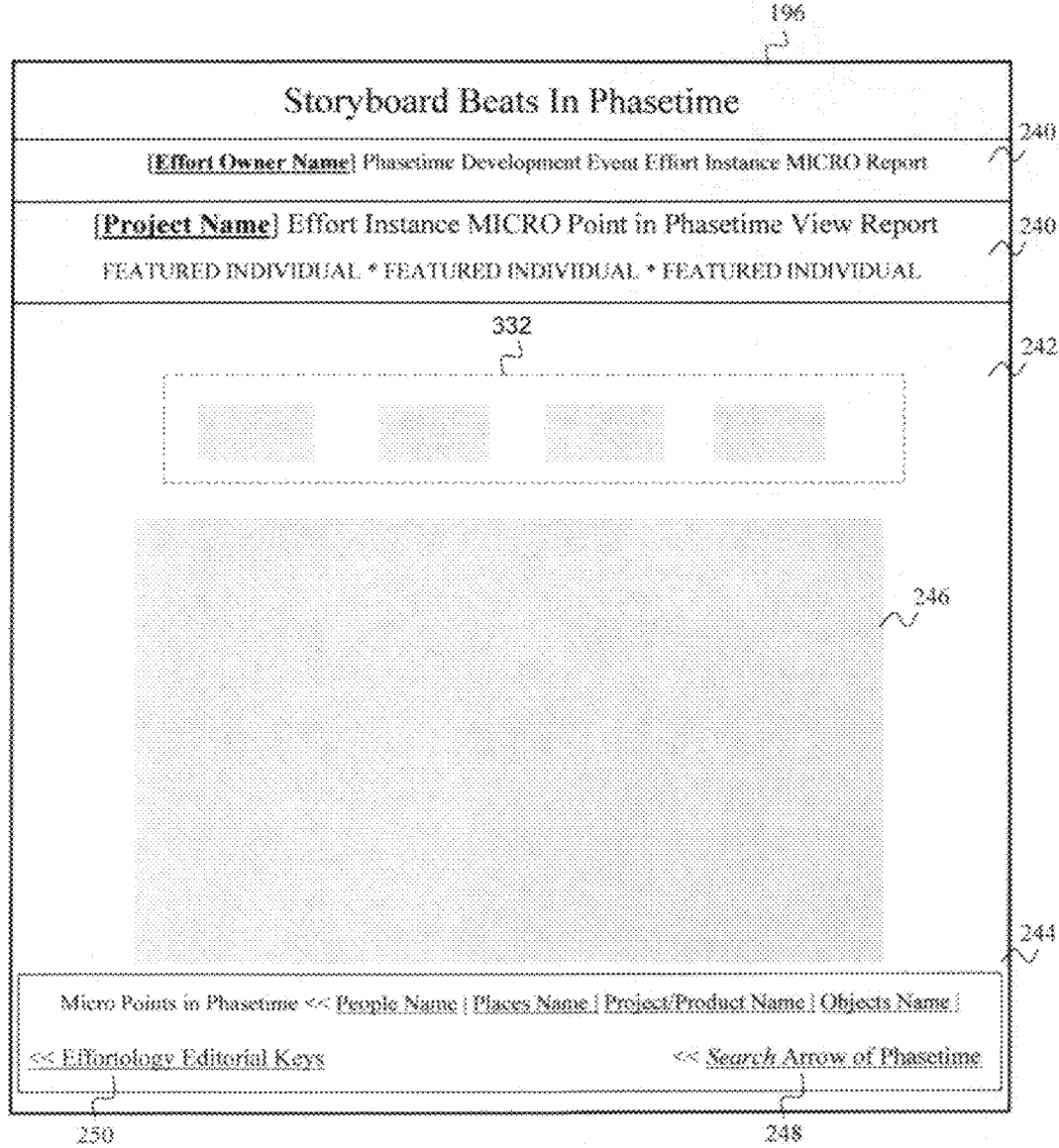
FIG. 7 Storyboard Beats in Phasetime drawing illustrates the Multimedia Content generating capabilities of the "Point in Phasetime Method and System Thereof" as related to the Storyboard Beats in Phasetime.

FIG. 5 also details that Phasetime Matrix Report 172 will display a Storyboard Beats in Phasetime Link 195 to a Storyboard Beats in Phasetime 196 see FIG. 7.

FIG. 6 illustrates the reporting capabilities of the "Point in Phasetime Method and System Thereof" as related to the display of Effort Instance Owner's 194 Effort Instance Report 162 164 166 168, as well as those Effort Instance Reports 162 164 166 168 of Elements 100 associated to Effort Instance Owner 194 through their Effort Instance 116, all of which is reported within Phasetime Matrix Report 172.

Phasetime Matrix Report 172 is composed of the following sections:

1. Section 1: Header 174
2. Section 2: Phasetime Matrix 176
3. Arrow of Phasetime X Axis 178
4. Section 3: Effort Instance PiPT Window 179

According to FIG. 6, Section 1: Header 174 displays:

The name of Project (PR) 106 on which Effort Instance Owner 194 has Effort 114.

Project Phasetime Past/Present/Future Indicator 192—denotes if Project 106 was released in the past and is Past Project Effort 152, is a present release and is Present Project Effort 154, or is a future release and is Future Project Effort 156.

PiPT Effort Instance Indicator 272—denotes a Macro Phasetime 202, a Micro Phasetime 204, or a Nano Phasetime 206 view of Effort Instance Owner's 194 Effort Instance 116.

According to FIG. 6, Section 2: Phasetime Matrix 176 is used to display:

Effort Instance Owner's 194 name

Effort 114 of Effort Instance Owner 194 on Project (PR) 106

Effort Instance Owner's 194 contact information

A list of all of the Project (PR) 106 Phases of Development 208 according to a linear timeline. Phases of Development 208 include:

- A Concept Development (Blueprint) 210
- A Pre-Production 212
- Production 214
- A Post-Production 216
- A Manufacturing, Distribution, and Promotion 218
- A Post Manufacturing, Distribution, and Promotion 220

A Phase Boxes 222 which indicate the start date and end date of Phase of Development 208 along a linear timeline A shaded Effort Phase Box 224 which indicates the start and end dates on which Effort Instance Owner's 194 Effort 114 occurred along a linear timeline.

The shaded section of Effort Phase Box 224 within Project's 106 Phase of Development 208 is more or less a proportional representation of Effort Instance Owner's 194 Effort's 114 start and end dates, whose proportions are more or less in relation to the duration of the appropriate Phasetime and its context to the earliest start date of a Phasetime Clockwork I 228 and its latest end date in a Phasetime Clockwork V 236, or if republished, in a Phasetime Clockwork VI 238.

Phase Boxes 222, Effort Phase Boxes 224, and Arrow of Phasetime X Axis 178 are interactive. Clicking or putting a mouse over Phase Boxes 222 or Effort Boxes 224 controls the content in Section 3: Effort Instance PiPT Window 179.

According to FIG. 6, Arrow of Phasetime X Axis 178 is used to display:

Phase Boxes 222 and Effort Phase Boxes 224 in relationship to the corresponding Phase of Development 208 and a Phasetime Clockworks 226 which indicates a Project Phasetime 300:

- Phasetime Clockwork I 228—Concept Development 210
- A Phasetime Clockwork II 230—Pre-Production 212
- A Phasetime Clockwork III 232—Production 214
- A Phasetime Clockwork IV 234—Post-Production 216
- Phasetime Clockwork V 235—Mfg./Dist./Promotion 218

Phasetime Clockwork VI 236—Post Mfg./Dist/Promotion 220

According to FIG. 6, Section 3: Effort Instance PiPT Window 179 is used to display:

All Element's 100 who have Effort Instance Reports 162 164 166 168 as they relate to the specific Phase of Development 208 on Project 106.

The list of Elements 100 are displayed within Section 3: Effort Instance PiPT Window 179 when a user clicks on Phase Box 222 or Effort Box 224 within Section 2: Phasetime Matrix 176, or by mousing over Phasetime Clockworks 226 230 232 234 235 236 within Arrow of Phasetime X Axis 178.

Effort 114 values related to those Elements 100 who have an Efforts in Phasetime 200.

The start and end dates on which those displayed Efforts in Phasetime 200 occurred.

Past, Present and Future Effort Instance Reports 162 164 166 168 indicated in Section 1: Header, and referenced in Arrow of Phasetime X Axis 178.

Macro, Micro, and Nano Effort Instance Reports 162 164 166 168 indicated in Section 1: Header 174, referenced in Arrow of Phasetime X Axis 178, and selected from Section 2 an Arrow of Phasetime Clockwork Icons 274.

Past Project Effort 152 data which is selected by clicking or putting a mouse over Arrow of Phasetime X Axis 178 arrow pointing to the screen's left.

Future Project Effort 156 data which is selected by clicking or putting a mouse over Arrow of Phasetime X Axis 178 arrow pointing to the screen's right, all of which may link to Storyboard Beats In Phasetime 196.

FIG. 7 illustrates the reporting capabilities of the "Point in Phasetime Method and System Thereof" as related to Storyboard Beats in Phasetime 196.

Storyboard Beats in Phasetime 196 is accessed from Phasetime Matrix Report 172. It contains the following design components and corresponding attributes:

A Storyboard Header Section 240—Displays Project (PR) 106 info, Effort Instance Owner's 194 Effort 114 and info, and Macro Phasetime 202, Micro Phasetime 204 or Nano Phasetime 206 details.

A Storyboard Body Section 242—Displays a Macro, Micro, Nano Multimedia Content 246 which can include, but is not limited to, music, video, picture, motion graphics, etc.

A Storyboard Footer Section 244—Displays additional Storyboard Beats in Phasetime 196 information or links which can include, but are not limited to, a Search Links 248 and an Effortology Editorial Keys 250 links.

FIG. 8 defines System Core Database 148 parameters used by the "Point in Phasetime Method and System Thereof" to generate Storyboard Beats in Phasetime 196 data.

According to FIG. 4, Core Database 148 stores Past, Present, and Future Effort 152 154 156 data which is processed by Effort Instance and Phasetime Data Virtual Matrix 126. FIG. 8 builds on this principle by defining those Macro, Micro, and Nano Phasetime Modules used to generate Storyboard Beats in Phasetime 196 content.

Accordingly, Core Database 148 includes at least a Macro, Micro, and Nano Storyboard Modules 252 which include, but are not limited to the following:

A Storyboard Header Generator Module 254
A Storyboard Multimedia Body Generator Module 256
A Storyboard Footer Generator Module 258

FIG. 8 illustrates that a Macro, Micro, and Nano Multimedia Database 260 exists within the "Point In Phasetime Method and System Thereof," wherein Macro, Micro, and Nano Multimedia Database 260 outputs Macro, Micro, Nano Multimedia Content 246 into Storyboard Beats In Phasetime 196 via Storyboard Multimedia Body Generator Module 256. Macro, Micro, Nano Multimedia Content 246 can include, but is not limited to, the following:

Video
Music
Motion Graphics
Images

Macro, Micro, and Nano Storyboard Modules 252 are used to populate the data that appears within Storyboard Beats in Phasetime 196. The following describes each module and the corresponding Storyboard data it reports:

Storyboard Header Generator Module 254—Reports Project (PR) 106 info and Effort Instance Owner's 194 Effort 114 and info within Storyboard Header Section 240 of Storyboard Beats in Phasetime 196.

Storyboard Multimedia Body Generator Module 256—Reports Macro, Micro, and Nano Multimedia Content 246 within Storyboard Body Section 242 of Storyboard Beats In Phasetime 196.

Storyboard Footer Generator Module 258—Reports additional Storyboard Beats in Phasetime 196 information or links that can include, but are not limited to, Search Links 248 and Effortology Editorial Key 250 links.

FIG. 9 is a very high line diagram that details all of the System database parameters and reporting modules used by the "Point in Phasetime Method and System Thereof" in the generation of Phasetime Matrix Report 172 and Storyboard Beats in Phasetime 196 data.

According to FIG. 9, the "Point in Phasetime Method and System Thereof" is comprised of, but not limited to, the following databases:

Data Repository Database 150
Core Database 148
Macro, Micro, Nano Multimedia Database 260

Multimedia exhibits are transferred from Data Repository Database 150 to Macro, Micro, Nano Multimedia Database 260 via an Editing & Formatting Processes 268, wherein Editing and Formatting Processes 268 will create formatted and organized Macro, Micro, Nano Multimedia Content 246 for Storyboard Beats In Phasetime 196.

Effort Instance 116 and Point In Phasetime 112 data are output from Core Database 148 by a Phasetime Matrix Report Generating Module 270 and displayed within Phasetime Matrix Reports 172 and Effort Instance Reports 162 164 166 168.

Finally, the diagram details that Storyboard Beats In Phasetime 196 is accessed from Phasetime Matrix Reports 172 and Effort Instance Reports 162 164 166 168, wherein the Micro, Macro, and Nano Phasetime 202 204 206 Storyboard Beats In Phasetime 196 data are dynamically extracted from both Core Database 148 and Macro, Micro, Nano Multimedia Database 260 by Micro, Macro, and Nano Storyboard Modules 252.

Figure 10:
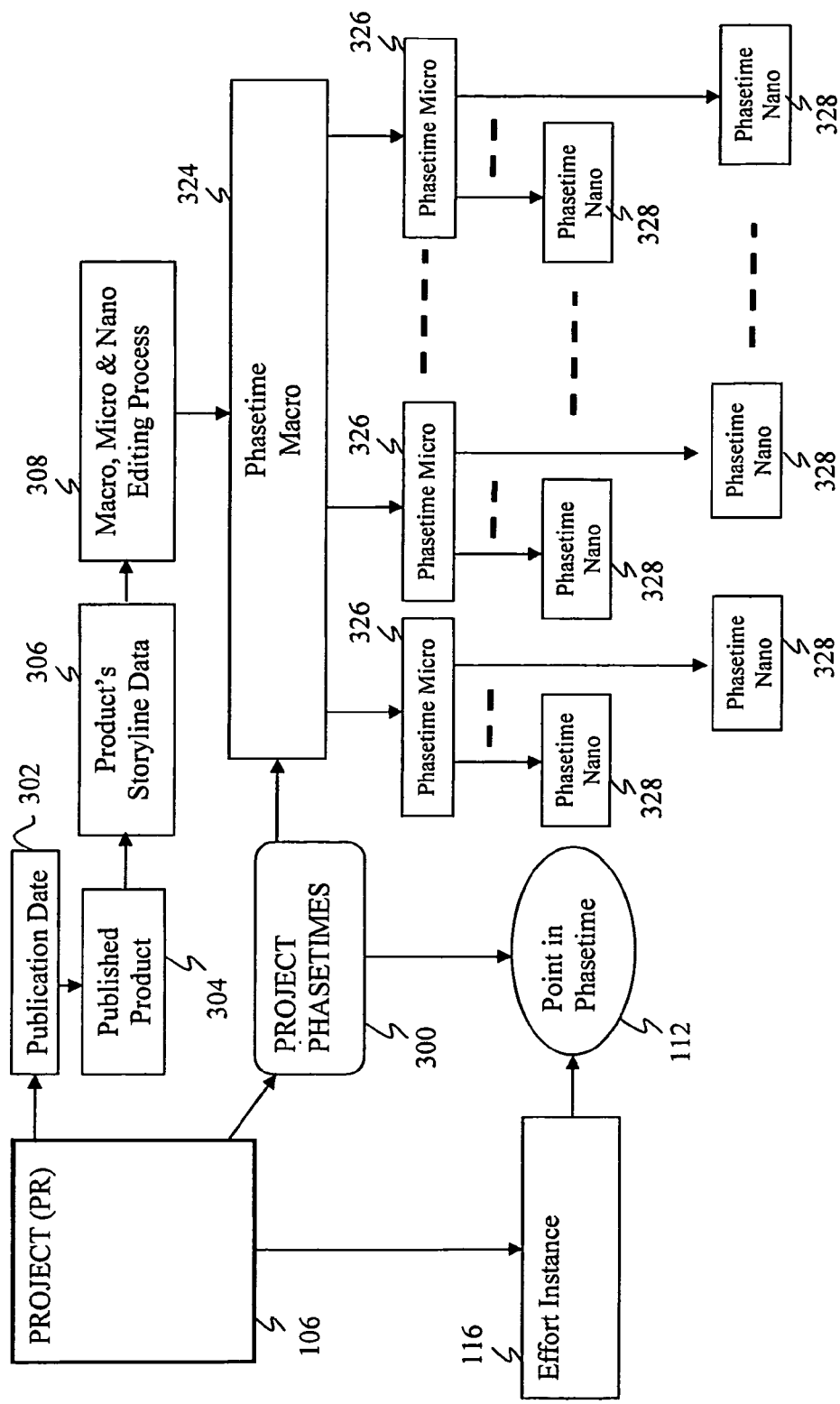
FIG. 10 Detailed Phasetime Project/Published Product Macro, Micro, and Nano Logic Data Drawing illustrates how Phasetime Macro, Phasetime Micro, and Phasetime Nano Storyline Views are related hierarchically and generated by the System from Published Products.

FIG. 10 details how a Phasetime Macro Storyline View 312, a Phasetime Micro Storyline View 316, and a Phasetime Nano Storyline View 320 are generated from Published Products 304.

According to FIGS. 1-4, Project (PR) 106 exists in which all Elements 100 exert their Efforts 114 in Effort Instance 116. This concept is expanded in FIG. 10 by detailing those additional Project (PR) 106 attributes used in Effort Instances 116 as related to Points in Phasetime 112 and the generation of Project Phasetime 300 data and reports.

Projects (PR) 106 have corresponding Project Phasetimes 300 which can be broken down into six Phases of Development 208, wherein Phases of Development 208 detail the Project's (PR) 106 development cycle. Specifically, Phases of Development are designated segments of Project's (PR) 106 development cycle according to its Product type:

1) Concept Development (Blueprint) 210
2) Pre-Production 212
3) Production 214
4) Post-Production 216
5) Manufacturing/Distribution/Promotion 218
6) Post Manufacturing/Distribution/Promotion 220

Effort Instances 116 are related to Project Phasetimes 300 by Point in Phasetime 112 values which detail "when" Element 100 exerted their Effort 114 on Project (PR) 106. In addition Projects (PR) 106 will become Published Products 304 after they have officially been published or released to the public. Specifically, this occurs when Project (PR) 106 is issued a Publication Date 302, the date on which Project (PR)

106 is published and becomes Published Product 304, a Phasetime Parturient Event 303.

FIG. 10 also details that a Product Storyline Data 306 is converted into a Phasetime Macro 324, a Phasetime Micro 326, and a Phasetime Nano 328 data jointly by a Storyline Editor 307 and an Effortologist 309 during a Macro, Micro, and Nano Editing Process 308 derived from Project Phasetimes 300, wherein Project Phasetimes 300 are furnished by the Project's (PR) 106 Effort Instance 116 and corresponding Points In Phasetime 112.

Macro, Micro, and Nano Editing Processes 308 are used to produce Macro Phasetime 202, Micro Phasetime 204, and Nano Phasetime 206 Phasetime data for Phasetime Macro, Micro, and Nano Storyline Views 312 316 320 which can include, but are not limited to, the following:

1. Phasetime Macro 324—A landscape view of Effort Instance Owner's 194 Effort 114 on Project (PR) 106 at Point in Phasetime 112.
2. Phasetime Micro 326—A portrait view of Effort Instance Owner's 194 Efforts 114 on Project (PR) 106 at Point in Phasetime 112.
3. Phasetime Nano 328—A close-up view of Effort Instance Owner's 194 Effort 114 on Project (PR) 106 at Point in Phasetime 112.

Figure 11:
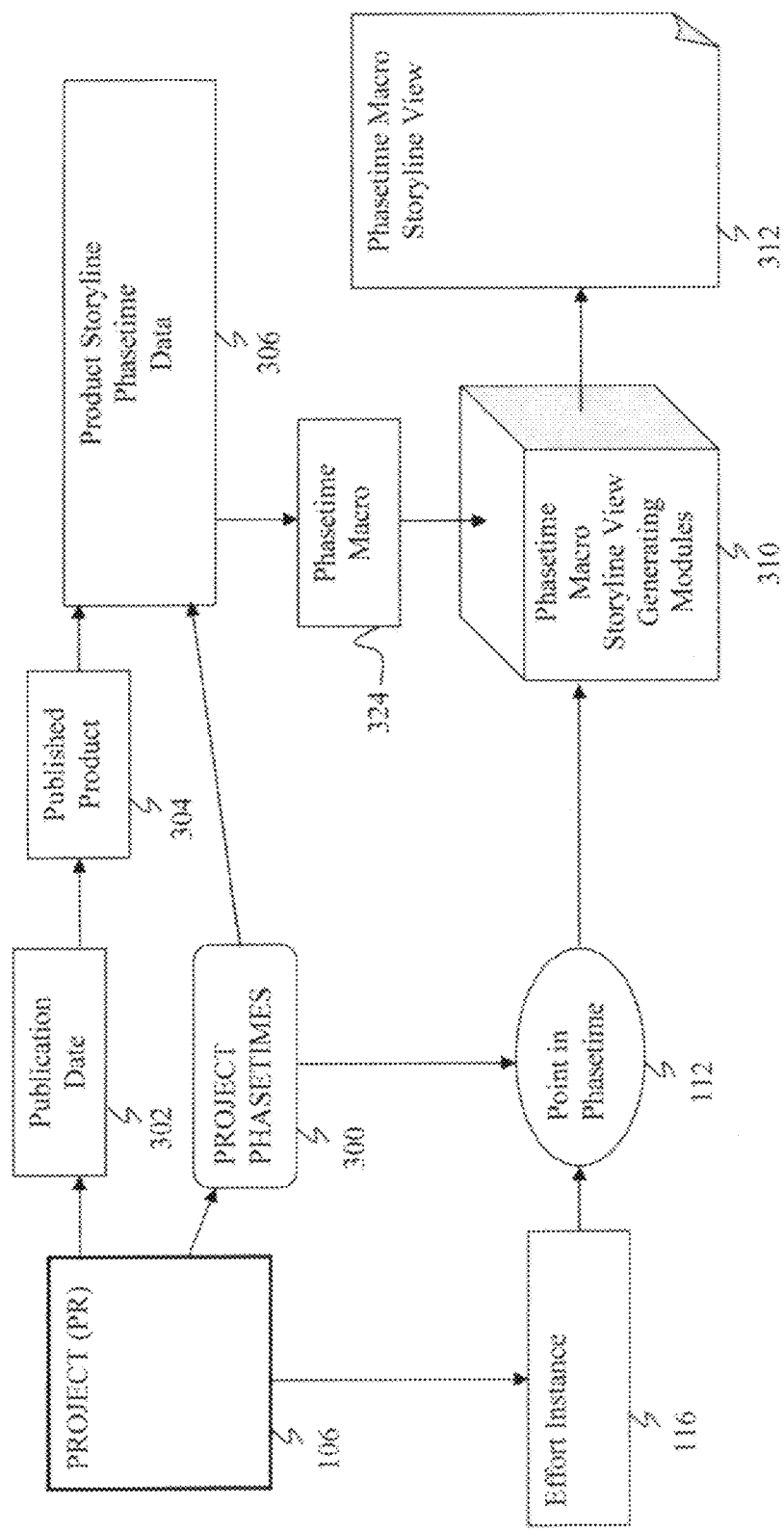
FIG. 11 Phasetime Project/Published Product Macro Storyline View Drawing details how Phasetime Macro Storyline Views are generated by the System from Published Products FIG. 12 Phasetime Project/Published Product Micro Storyline View drawing details how Phasetime Micro Storyline Views are generated by the System from Published Products.

FIG. 11 illustrates how Phasetime Macro Storyline Views 312 are generated from Published Products 304.

According to FIGS. 10 and 11, Project (PR) 106 exists on which all Elements 100 exert their Efforts 114 in Effort Instance 116, whereby additional Project (PR) 106 attributes used in Effort Instances 116 are related to Points in Phasetime 112 and the generation of Project Phasetime 300 data and reports. Accordingly, Projects (PR) 106 have corresponding Project Phasetimes 300 which can be broken down into six Phases of Development 208, wherein Phases of Development 208 detail Project's (PR) 106 development cycle.

FIGS. 10 and 11 further delineate that Effort Instances 116 are related to Project Phasetimes 300 by Point in Phasetime 112 values which detail "when" Element 100 exerted their Effort 114 on Project (PR) 106. In addition Projects (PR) 106 will become Published Products 304 after they have officially been published or released to the public. Specifically, this occurs when the Project (PR) 106 is issued Publication Date 302, the date on which Project (PR) 106 is published and becomes Published Product 304.

FIG. 11 expands on this concept by detailing that Product Storyline Data 306 is converted into Phasetime Macro 324 data jointly by Storyline Editor 307 and Effortologist 309 during Macro, Micro, and Nano Editing Process 308 derived from Project Phasetimes 300. Macro, Micro, and Nano Editing Process 308 is used to produce Phasetime Macro 324 data which are displayed within Phasetime Macro Storyline View 312 report, wherein a Phasetime Macro Storyline View Generating Module 310 is used to create Phasetime Macro Storyline View 312 report.

Phasetime Macro Storyline View 312 is a landscape view of Published Product 304, wherein the objective of said landscape view is to provide a Storyline Product overview, whose a Beats in Phasetime 332 associate Effort Instance Owner's 194 Effort 114 to appropriate Phasetime Macro 324 landscape view attributes, which are comprised of hi-line Phasetime Micro 326 view data of Effort Instance Owner's 194 a Phasetime Development Event Instance 334.

Phasetime Development Event Instances 334 occur when Effort Instance Owners 194, People 102, Places 104, Projects2 110, and Objects 108, perform conjoined Efforts 114 on Project (PR) 106 in relation to Point in Phasetime 112 within Phase of Development 208 of Published Product 304.

Figure 12:
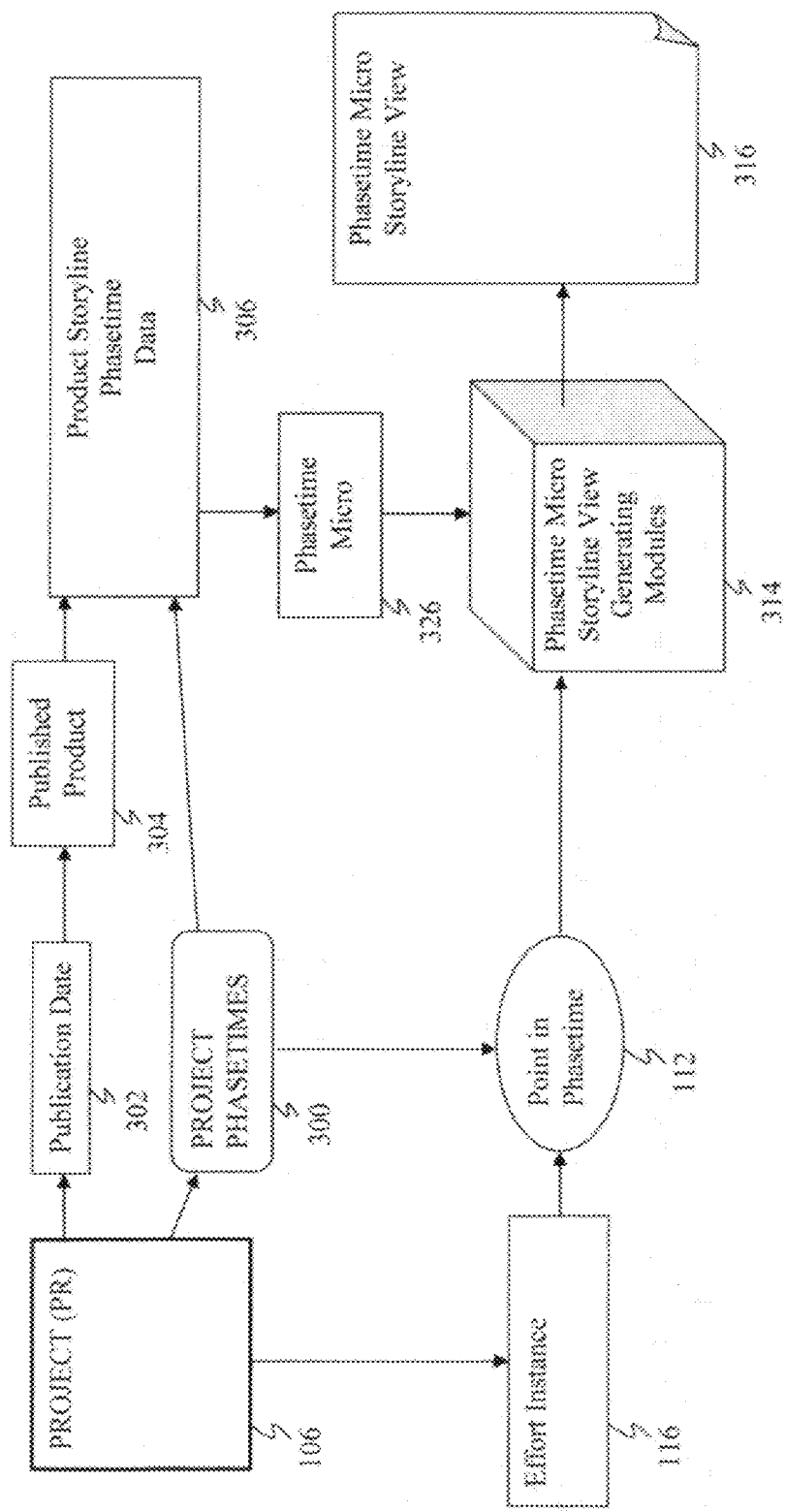

FIG. 12 illustrates how Phasetime Micro Storyline Views 316 are generated from Published Products 304.

According to FIGS. 10, 11, and 12, Project (PR) 106 exists on which all Elements 100 exert their Efforts 114 in Effort Instance 116, whereby additional Project (PR) 106 attributes used in Effort Instances 116 are related to Points in Phasetime 112 and the generation of Project Phasetime 300 data and reports. Accordingly, Projects (PR) 106 have corresponding Project Phasetimes 300 which can be broken down into six Phases of Development 208, wherein Phases of Development 208 detail the Project's (PR) 106 development cycle.

FIGS. 10, 11, and 12 further define that Effort Instances 116 are related to Project Phasetimes 300 by Point in Phasetime 112 values which detail "when" Element 100 exerted their Effort 114 on Project (PR) 106. In addition, Projects (PR) 106 will become Published Products 304 after they have officially been published or released to the public. This occurs when Project (PR) 106 is issued Publication Date 302, the date on which the Project 106 is published and becomes Published Product 304.

FIG. 12 expands on this concept by detailing that Product Storyline Data 306 is converted into Phasetime Micro 326 data jointly by Editor 307 and Effortologist 309 during Macro, Micro, and Nano Editing Process 308 derived from Project Phasetimes 300. Macro, Micro, and Nano Editing Process 308 is used to produce Phasetime Micro 326 data which are displayed within Phasetime Micro Storyline View 316 report, wherein a Phasetime Micro Storyline View Generating Module 314 is used to create Phasetime Micro Storyline View 316 report.

Phasetime Micro Storyline View 316 is a portrait view of Published Product 304, wherein the objective of said portrait view is to provide a Storyline Product scene-sequence view, whose Beats in Phasetime 332 associate Effort Instance Owner's 194 Effort 114 to appropriate Phasetime Micro 326 portrait view attributes, which are comprised of hi-line Phasetime Nano 328 view data of Effort Instance Owner's 194 Phasetime Development Event Instance 334.

Phasetime Development Event Instances 334 occur when Effort Instance Owners 194, People 102, Places 104, Projects 106, and Objects 108, perform conjoined Efforts 114 on Project (PR) 106 in relation to Point in Phasetime 112 within Phase of Development 208 of Published Product 304.

Figure 13:
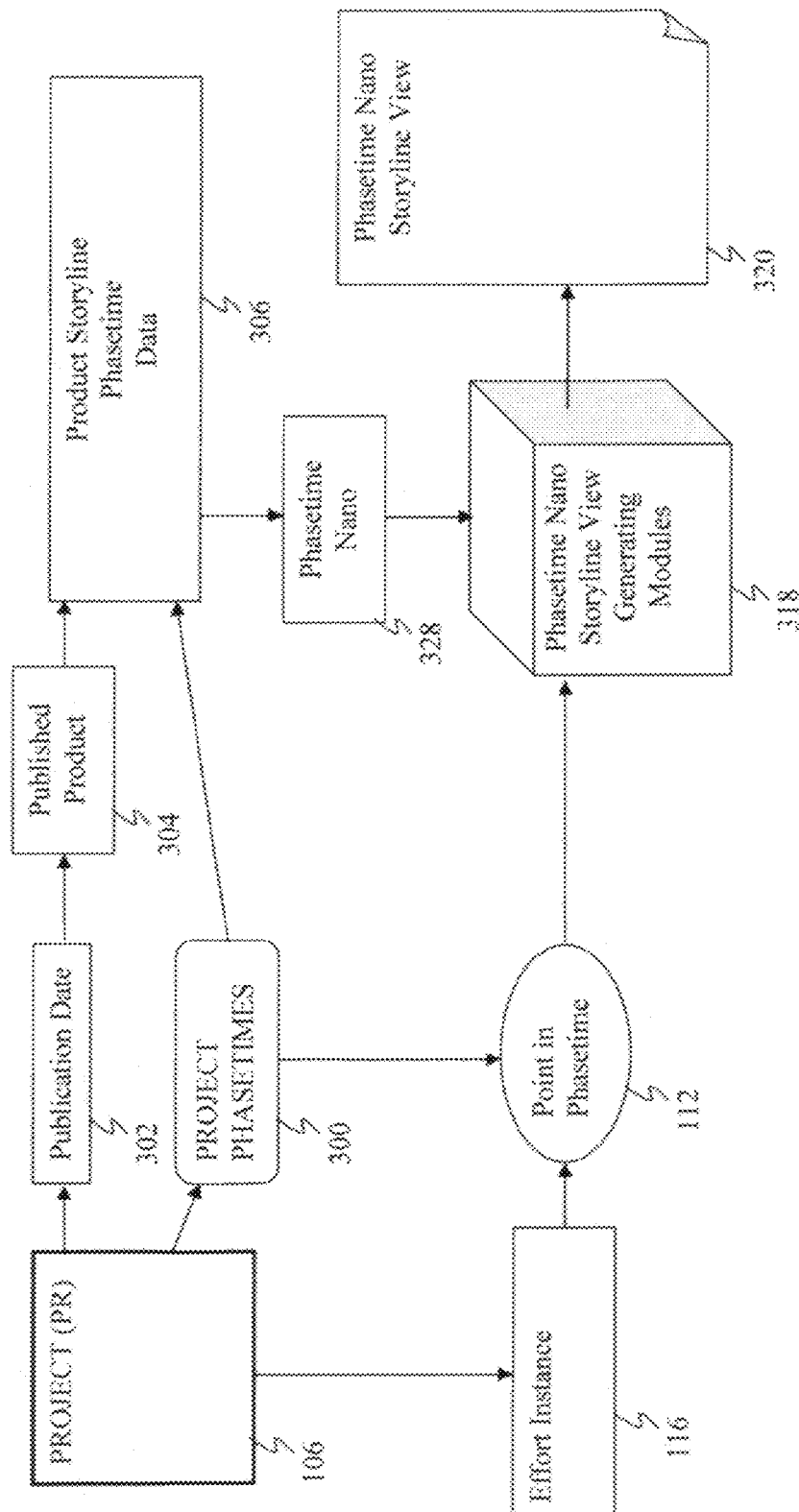
FIG. 13 Phasetime Project/Published Product Nano Storyline View drawing details how Phasetime Nano Storyline Views are generated by the System from Published Products.

FIG. 13 details how Phasetime Nano Storyline Views 320 are generated from Published Products 304.

According to FIGS. 10-13, Project (PR) 106 exists in which all Elements 100 exert their Efforts 114 in Effort Instance 116, whereby additional Project (PR) 106 attributes used in Effort Instances 116 are related to Points in Phasetime 112 and the generation of Project Phasetime 300 data and reports. Projects (PR) 106 have corresponding Project Phasetimes 300 which can be broken down into six Phases of Development 208, wherein Phases of Development 208 detail Project's (PR) 106 development cycle.

FIGS. 10-13 further delineate that Effort Instances 116 are related to Project Phasetimes 300 by Point in Phasetime 112 values which detail "when" Element 100 exerted their Effort 114 on Project (PR) 106. In addition Projects (PR) 106 will become Published Products 304 after they have officially been published or released to the public. This occurs when Project (PR) is issued a Publication Date 302, the date on which the Project 106 is published and becomes Published Product 304.

FIG. 13 expands on this concept by detailing that Product Storyline Data 306 is converted into Phasetime Nano 328 data jointly by Editor 307 and Effortologist 309 during Macro, Micro, and Nano Editing Process 308 derived from Project Phasetimes 300. Macro, Micro, and Nano Editing Process 308 is used to produce Phasetime Nano 328 data which are displayed within Phasetime Nano Storyline View 320 report, wherein a Phasetime Nano Storyline View Generating Module 318 is used to create Phasetime Nano Storyline View 320 report.

Phasetime Nano Storyline View 320 is a close-up view of Published Product 304, wherein the objective of said close-up view is to provide a Storyline 336 product scene blueprint view, whose Beats in Phasetime 332 associate Effort Instance Owner's 194 Effort 114 to appropriate Phasetime Micro 326 portrait view attributes, which are comprised of hi-line Phasetime Nano 328 view data of Effort Instance Owner's 194 Phasetime Development Event Instance 334.

Phasetime Development Event Instances 334 occur when Effort Instance Owners 194, People 102, Places 104, Projects 106 and Objects 108, perform conjoined Efforts 114 on Project (PR) 106 in relation to Point in Phasetime 112 within Phase of Development 208 of Published Product 304.

Figure 14:
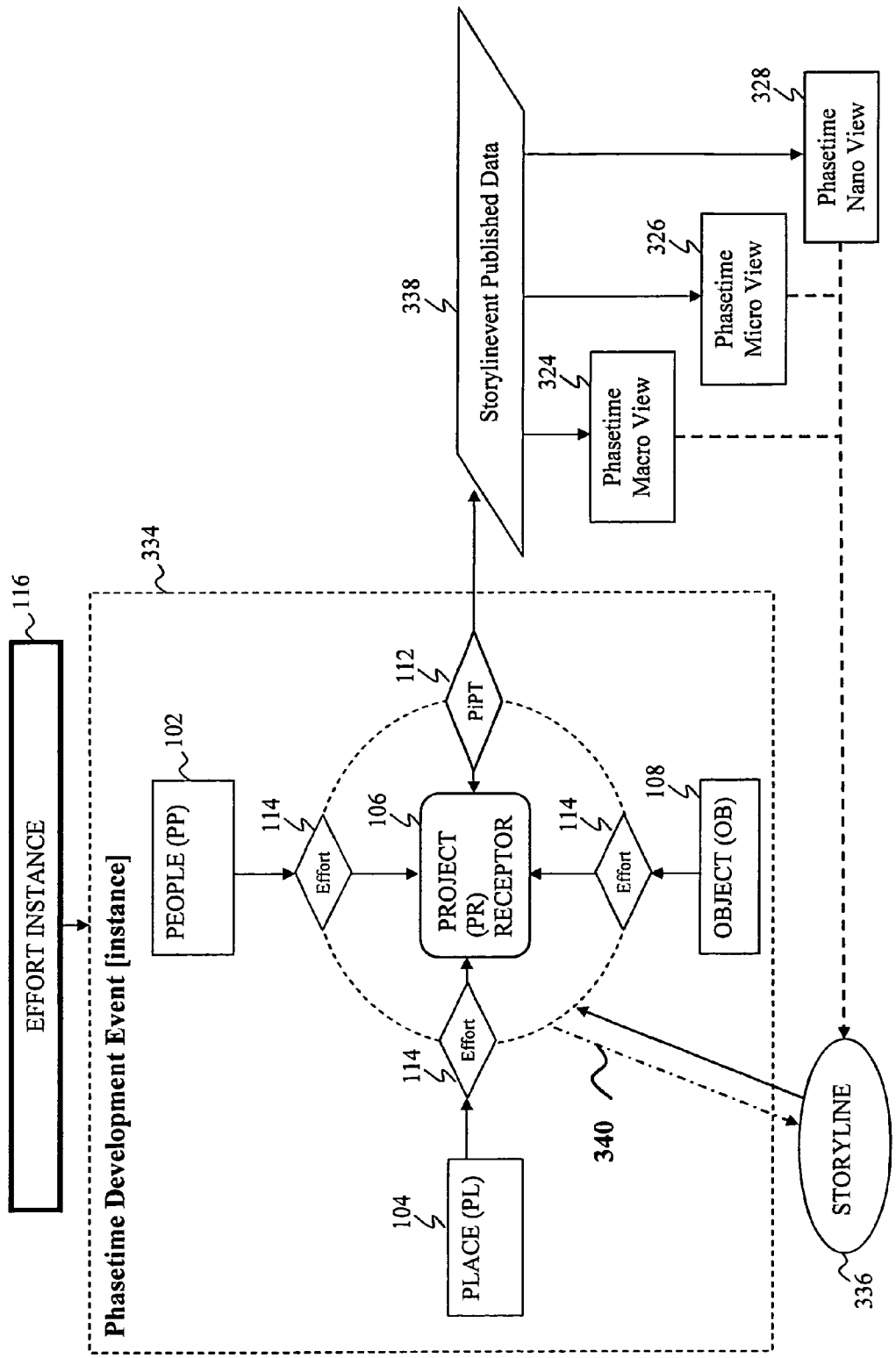
FIG. 14 Effort Instance PiPT Storylinevent drawing illustrates the Phasetime Development Event Instance and the interaction between the Storyline and the Element Efforts as they relate to the Storylinevent Published Data.

FIG. 14-According to FIGS. 1, 2, 3, 4, 10, 11, 12, and 13, the "Point in Phasetime Method and System Thereof" is comprised of Effort Instances 116 which are constructed of Elements 100 that are associated to one another via their Efforts 114 on Project (PR) 106 within Point In Phasetime (PiPT) 112. FIG. 14 expands on this concept by illustrating how Effort Instances interact and affect Point in Phasetime 112 a Storyline 336 as displayed within Phasetime Macro, Micro, and Nano Storyline Views 312 316 320.

According to FIG. 14, Storyline 336 is an attribute of Effort 114 by any Element 100 that details the creative decisions involved in the production of Project (PR) 106 as defined by Phasetime Development Event Instance 334. Phasetime Development Event Instance 334 is defined as a development event that occurs when the Elements 100, People (PP) 102, Places (PL) 104, Projects (PR) 106, and Objects (OB) 108, perform conjoined Efforts 114 on Project (PR) 106 in relation to Point in Phasetime 112 within Phase of Development 208 of an industry product.

Projects (PR) 106 will become Published Products 304 after they have officially been published or released to the public. This occurs when Project (PR) is issued Publication Date 302, the date on which Project 106 is published and becomes Published Product 304.

In addition, a Storylinevent Published Data 338 are converted from Point In Phasetime 112 of Phasetime Development Event Instance 334 into Phasetime Macro 324, Phasetime Micro 326, and Phasetime Nano 328 data jointly by Storyline Editor 307 and Effortologist 309 during Macro, Micro, and Nano Editing Process 308 derived from Project Phasetimes 300, wherein Project Phasetimes 300 are furnished by Project's (PR) 106 Effort Instance 116 and corresponding Points In Phasetime 112.

Diagram 14 details dotted lines which tie Phasetime Macro, Micro, and Nano Storyline Views 312 316 320 to Product Storyline 336 within Phasetime Development Event Instance 334. The solid line emanating from Storyline 336 and concluding at Efforts 114 reflects how Storyline 336 affects Element 100 Efforts 114 and Production 214. The dash-dotted line emanating from Efforts 100 and concluding at Storyline 336 indicates how Element 100 Efforts 114 may in turn affect Storyline 336 through Storylineefforts/Storylinefx 340.

The ability for the Phasetime Development Event Instance 334 to affect the Storyline 336 is an attribute of Effort 114 by Element 100 which goes to the heart of Published Product's 304 story, whether the Element 100 is in front of or behind the camera, microphone, etc.

What is claimed is:

1. A point in phasetime method for reporting an element's effort on an end product from a group including art, industry, and nature by a point in phasetime within an appropriate phase of development whereby the point in phasetime method reports efforts for past, present, and future projects by phasetime macro, micro, and nano points in phasetime views, said point in phasetime method comprising:

a master computer housing a relational phasetime database for receiving and storing points in phasetime data on development event efforts of elements as related to a project development of an end product, receiving and storing element effort data and phasetime data in the phasetime database as to a phase of development, receiving and storing general profile data on elements having development event efforts in the project development of a product, structuring effort and phasetime data as to number and types of phases in the project development of a product, and for reporting said phasetime data in a phasetime report, a mode of communication, including a computerized device, for scientifically gathering phasetime effort data for elements having project development event efforts on an end product, a client machine electronically linked to the master computer for submitting points in phasetime effort data for elements having project development event efforts, a search system whereby element development efforts and phasetime data are queried by the client machine, retrieved from a master server's phasetime database by a phasetime report generator module, and dynamically reported to a client machine, and said client machine at least electronically linked to the master computer for querying the phasetime database and receiving a search return report from the phasetime database with a link to a selected element's phasetime matrix report, wherein the phasetime matrix report consists of three parts, a project header, a phasetime matrix, and a matrix point in phasetime effort, the latter two parts forming a two-dimensional graphical display with three-dimensional attributes that appears in two interactive segments windows at least display data regarding a project's phases of development and start and end date timeframes, and an element's effort and the point in phasetime, which is proportionally displayed within a context of the effort's appropriate phase of production development, an arrow of phasetime x axis which graphically depicts a project's past, present, and future phase of development, a graphical display of other element efforts in that same phase of development, and a graphical display that accesses an effort's phasetime macro, micro, and nano storyline views, said phasetime matrix at least comprising:

a first part, wherein matrix header displays a project name, past, present and future indicator icons indicating if the reported project is a past project already published, a present project currently in production for which a release date has been contracted, or a future project not yet in production but for which a projected release date has been contracted, and macro, micro and nano indicator icons indicating if the reported effort is a phasetime macro landscape view, a phasetime micro portrait view, or a phasetime nano close-up view, a second part, a phasetime matrix window segment, comprising an effort owners name and effort, a production artifacts link, an effort owners point of contact, a y axis vertically displaying all the phases of production in the project's development, selecting from a group including concept development, pre-production, production, post production, manufacturing/distribution/promotion, and post manufacturing/distribution/promotion, an x axis horizontally comprising an arrow of phasetime which is divided into segments that correspond to the duration of each of the production phasetimes on a project, with an arrow pointing left indicating past project data, an arrow pointing right indicating future project data, and a clockworks function that tracks both project phasetimes and product content runtimes whereby individual arrow of phasetime clockwork icons representing each phase of development of the project enable a browser to access phasetime macro, micro, and nano views for display within a lower third section of the phasetime matrix, an open phase box indicator proportional box size graphically approximates a duration of a development phasetime's reported start and end dates for each development phasetime reported by a x axis arrow of phasetime and y axis phasetime designations, a shaded phase box inside the open phase box depicting an effort's start and end dates and in which phasetime the effort occurred, a third part, a phasetime point in phasetime effort window segment which interacts with part two's arrow of phasetime, comprising a window automatically displaying efforts of other elements efforts occurred within same phase of development as an owners effort which appears in part two's effort display box, with links from those other element efforts to that element's effort report, a window dynamically displaying other element efforts which occurred on the same project within different phases of development when a user rolls over and clicks on an open phase box in part two's phasetime matrix window with links from each of those displayed other element efforts to that element's individual effort report, a window dynamically displaying all element efforts which occurred on the same project in all phases of development with phasetime macro, micro, and nano storyline views when a user rolls over and clicks on an appropriate arrow of phasetime clockworks icon from which a user then accesses selected storyboard beats in phasetime macro, micro, and nano storyline view.

2. The point in phasetime method as set forth in claim 1 and wherein the storyboard beats in phasetime macro, micro, and nano storyline view at least displays an element's phasetime macro, micro, and nano views according to said storyboard beats in phasetime for past, present, and future projects/products for an element having a production development effort on a published project or on a project with a publication date, wherein production data are processed by a storyline architect hierarchical and relational storyline data views are mapped, stored by, and accessed through effortology keys by an effortologist who edits effort data per appropriate storyline beats in phasetime rules and procedures, said storyboard beats in phasetime comprising:

a header section displaying storyboard attributes including report name, effort owner's name, point in phasetime view being displayed in a storyboard, project name, and featured individuals on the project, a center section for the display of phasetime macro, micro, and nano storyline views, which views of an element's effort are accessed through a beats in phasetime storylinevent icon that has been processed by a storyline architect, a phasetime macro landscape view that is a storyline product overview said beats in phasetime associate an element's effort instance to appropriate phasetime macro landscape view attributes, as determined by an effortologist, which are comprised of hi-line micro view data of the element's development event instance, a phasetime micro portrait view that is a storyline product micro sequence said beats in phasetime associate an element's effort instance to appropriate phasetime micro portrait view attributes which are comprised of hi-line nano view data of the element's development event instance, and a phasetime nano close-up view that is a storyline product nano blueprint said beats in phasetime link an element's effort instance to appropriate phasetime nano close-up attributes which are comprised of nano view data of each element's development event instance, which are then associated to a storyboard's beats in phasetime storylinevent icon, a lower section displaying (a) a micro points in phasetime link enabling a user to link to and view people, places, projects, and objects elements who have a macro, micro or nano storyboard beats in phasetime report on the project, (b) search arrow of phasetime links allowing the user to search six phases of a project's development, the past, present and future development phases of the published product, and the phasetime macro, micro, and nano attributes for said project and c) an effortology key that at least enables the user to select hierarchical and relational storyboard beats in phasetime reports by storylinevents, storylineffaorts and storylinefx have had an effect on the product's storyline, which enables the user to access a story behind the effort and said beats in phasetime for the subject project, and furthermore, wherein said effortology key also allows said user to alter said storyboard storyline report which includes said storylinevents, storylinefforts, storylinefx, and the story behind the efforts, and view the altered storyline report in the storyboard beats in phasetime.

\* \* \* \* \*